United States Patent
Biran et al.

(10) Patent No.: US 7,298,749 B2
(45) Date of Patent: Nov. 20, 2007

(54) COMPLETION COALESCING BY TCP RECEIVER

(75) Inventors: Giora Biran, Zichron-Yaakov (IL); Vadim Makhervaks, Yokneam (IL)

(73) Assignee: International Business Machines Corporation, Armonk, NY (US)

(*) Notice: Subject to any disclaimer, the term of this patent is extended or adjusted under 35 U.S.C. 154(b) by 702 days.

(21) Appl. No.: 10/752,731

(22) Filed: Jan. 7, 2004

(65) Prior Publication Data
US 2005/0147039 A1 Jul. 7, 2005

(51) Int. Cl.
*H04L 12/56* (2006.01)

(52) U.S. Cl. .................. 370/395.42; 709/212

(58) Field of Classification Search ......... 370/389, 370/394, 419, 463; 709/250
See application file for complete search history.

(56) References Cited

U.S. PATENT DOCUMENTS

| | | | | |
|---|---|---|---|---|
| 6,718,370 B1* | 4/2004 | Coffman et al. | ............. | 709/212 |
| 7,016,354 B2* | 3/2006 | Vangal et al. | ................ | 370/392 |
| 7,181,544 B2* | 2/2007 | Vangal et al. | ............... | 709/250 |
| 2002/0062402 A1* | 5/2002 | Regnier et al. | ............. | 709/313 |
| 2002/0152315 A1 | 10/2002 | Kagan et al. | | |
| 2003/0031172 A1 | 2/2003 | Grinfeld | | |
| 2003/0076822 A1* | 4/2003 | Shalom et al. | ............... | 370/378 |
| 2004/0042497 A1* | 3/2004 | Vangal et al. | ................ | 370/503 |
| 2004/0062267 A1* | 4/2004 | Minami et al. | ............. | 370/463 |
| 2005/0021558 A1* | 1/2005 | Beverly et al. | .......... | 707/104.1 |
| 2005/0033988 A1* | 2/2005 | Chandrashekhar et al. | . | 713/201 |
| 2005/0165985 A1* | 7/2005 | Vangal et al. | ................ | 710/107 |
| 2006/0168281 A1* | 7/2006 | Starr et al. | ................... | 709/230 |

OTHER PUBLICATIONS

Parallel TCP for High Performance Communication subsystems.*
Embedded Protocol Processor for Fast and Efficient Packet Reception.*

* cited by examiner

*Primary Examiner*—Hassan Kizou
*Assistant Examiner*—Salman Ahmed
(74) *Attorney, Agent, or Firm*—Ira D. Blecker; Hoffman, Warnick & D'Alessandro LLC (57) ABSTRACT

A method and system for completion coalescing by a Transmission Control Protocol (TCP) receiver (e.g., in a TCP/IP offload engine (TOE)). The method comprises: processing inbound TCP segments; and performing completion processing of received TCP ACKS and/or RDMA Read Requests independently of the processing of the inbound TCP segments.

17 Claims, 5 Drawing Sheets

COMPLETION COALESCING BY TCP RECEIVER

BACKGROUND OF THE INVENTION

1. Technical Field

The present invention relates generally to Transmission Control Protocol (TCP) systems. More particularly, the present invention provides a method, system, and computer program product for completion coalescing by a TCP receiver (e.g., in a TCP/IP offload engine (TOE)).

2. Related Art

As known in the art, TCP is a data transfer protocol that uses acknowledgement and timeout mechanisms to provide reliable services. To this extent, TCP assigns a sequence number to each byte transmitted, and expects a positive acknowledgement (ACK) from the receiving TCP. If the TCP ACK is not received within a timeout interval, the data is retransmitted. Other, more advanced retransmit schemes are also used, which allow the retransmit process to start upon reception of multiple (e.g., three) duplicated ACKS (a duplicated ACK is an ACK which does not change the left window edge of a TCP window).

The use of the acknowledgement mechanism is based on sending dedicated TCP ACK segments, or piggy-backing TCP ACK information in the TCP headers of data segments. However, processing of dedicated TCP ACK segments or piggy-backed TCP ACK information is a clear overhead to the network. One way that TCP attempts to reduce this overhead is by using a delayed TCP ACK approach. This approach allows a single TCP ACK to be sent for each two (or more) received TCP segments.

Additional TCP ACK processing overhead arises from the completion processing of each received TCP ACK segment or data segment carrying new TCP ACK information. As known in the art, such completion processing involves, for example, the reading and processing of a posted consumer request (e.g., descriptors read), to identify whether this request has been completed or not. A major problem with TCP, is that TCP does not provide a simple way to map TCP sequence numbers to consumer requests. In InfiniBand, for example, an acknowledgement segment carries not only a byte sequence number, but also a message sequence number. This allows ACK processing and completion handling to be performed without the need to gather information to perform ACK SN— to consumer request mapping. In TCP, however, an ACK does not carry such information. As such, in TCP, information must be gathered to perform ACK SN—to—consumer request mapping. One way to gather the required information involves the reading and processing of consumer requests. Therefore, performing such time consuming operations for each received TCP ACK both consumes network and processing resources and forces the logic processing of inbound TCP segments to wait for the completion processing of each received TCP ACK to finish, before processing the next TCP segment. Thus, the completion processing overhead comprises two parts: the overhead of the completion operation itself; and the coupling of inbound TCP segment processing logic with completion processing logic.

There is a need, therefore, for a method, system, and computer program product for processing inbound TCP segments (including ACKS) independently from completion processing. This allows the processing of inbound TCP segments to continue without waiting for the completion processing of each received TCP ACK to finish. Also, the delayed, separate completion processing allows the present invention to perform coalescing of ACKS (i.e., one completion operation may be performed for multiple ACKS, instead of one completion operation per ACK). The same approach may also be applied to the completion processing of RDMA Read Requests.

SUMMARY OF THE INVENTION

The present invention provides a method and system for processing inbound TCP segments (including ACKS) independently from completion processing. In particular, each received TCP ACK (dedicated or carried by a data segment) is not processed immediately by inbound segment processing logic, but is instead scheduled for processing using a completion coalescing list. Scheduling a connection for completion processing is done by updating TCP ACK information in a connection context, and adding the connection context to the completion coalescing list.

A first aspect of the present invention is directed to a method for completion processing, comprising: processing inbound TCP segments; and performing completion processing of received TCP ACKS independently of the processing of the inbound TCP segments.

A second aspect of the present invention is directed to a system for completion processing, comprising: TCP logic for processing inbound TCP segments; and a system for performing completion processing of received TCP ACKS independently of the processing of the inbound TCP segments.

A third aspect of the present invention provides a computer program product for performing the methods of the present invention.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

The present invention provides a method, system, and computer program product for completion coalescing by a Transmission Control Protocol (TCP) receiver.

Figure 1:
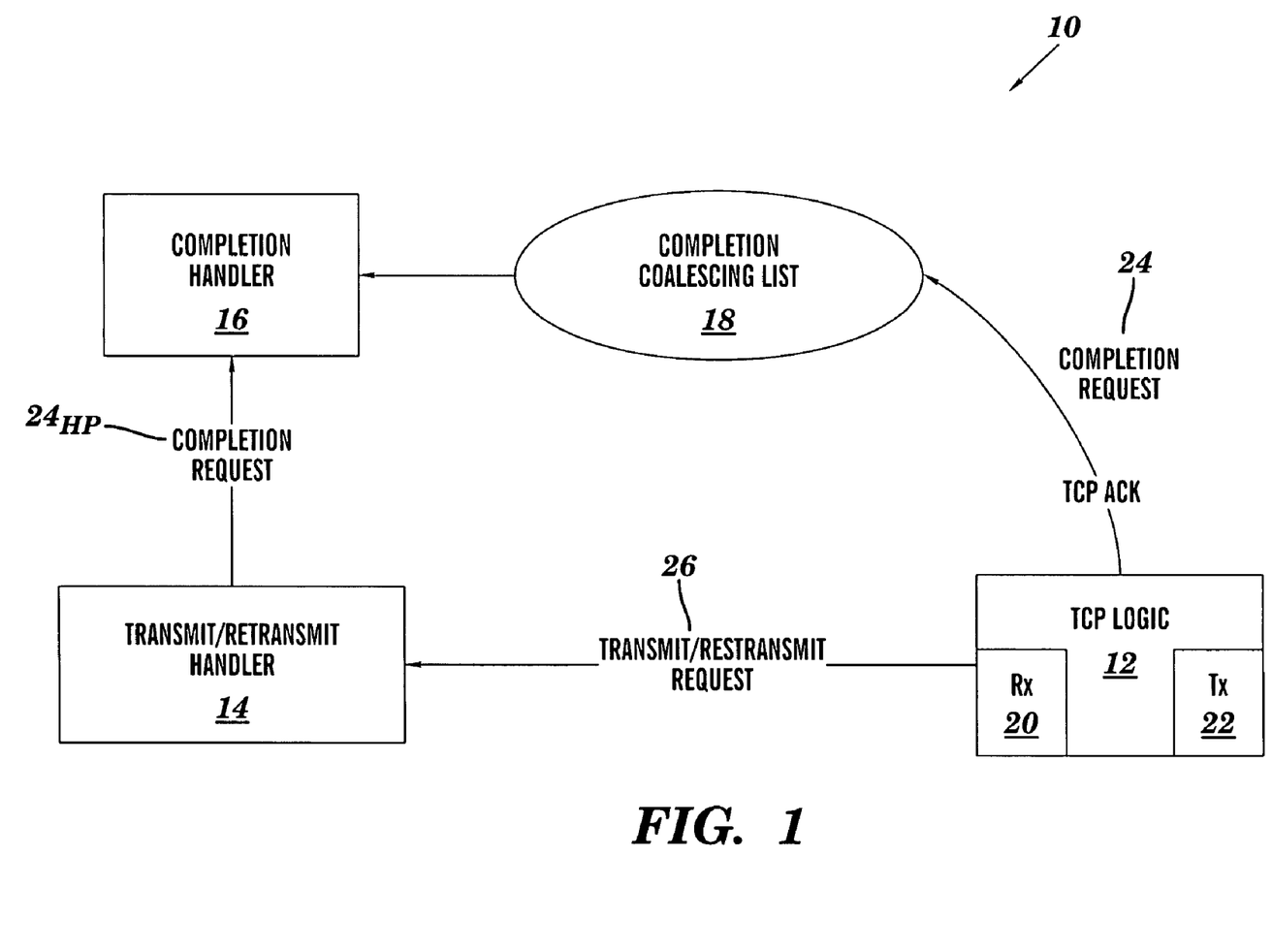
FIG. 1 illustrates a block diagram of a completion coalescing system for the completion processing of TCP ACKS in accordance with the present invention.

Referring now to FIG. 1, there is illustrated a block diagram of a completion coalescing system 10 in accordance with the present invention. It is assumed for the purposes of this description that the reader has an understanding of TCP commensurate with one skilled in the art. Accordingly, a detailed description of TCP is not provided herein.

Completion coalescing system 10 includes TCP logic 12, transmit/retransmit handler 14, completion handler 16, and completion coalescing list 18. In accordance with the present invention, the completion operation for each received TCP ACK (dedicated or carried by a data segment) is not processed immediately by TCP logic 12, but is instead scheduled for processing using a completion coalescing list 18. The TCP ACK, however, is processed immediately by TCP logic 12.

TCP logic 12 includes receive (Rx) TCP logic 20 and transmit (Tx) TCP logic 22. Rx TCP logic 20 processes received TCP segments. This includes, for example, extraction of TCP ACK information, such as the sequence number of the last acknowledged byte of the TCP data stream (i.e. LastAckedSN), from the received TCP segments. This information (i.e., LastAckedSN) is passed to completion handler 16 as a completion request 24. To pass this completion information (i.e., via a completion request 24) to completion handler 16, the present invention uses completion coalescing list 18. The completion information is passed via a connection context in completion coalescing list 18 (LastAckedSN is a field of the connection context which carries the most recently ACKed SN). The connection context itself is chained to completion coalescing list 18, but only if the connection does not have a pending completion request. If the connection is already waiting for completion handling in the completion coalescing list 18 (i.e., the connection already has a pending completion request), the information in the connection context is updated to carry the more recent LastAckedSN. This separates Rx TCP Logic 20 (or handling/processing of received TCP segments) from the relatively slow, and bursty completion process.

Tx TCP logic 22 of TCP logic 12 decides what should be transmitted for a given connection. Tx TCP 22 logic may decide to perform a transmit of the new TCP segment, or perform a retransmit of a previously transmitted TCP segment. Retransmit can be caused, for example, by a timeout, or by other fast-recovery methods implemented by Tx TCP logic 22. Tx TCP logic 22 passes a request 26 to perform a transmit/retransmit operation to the transmit/retransmit handler 14, which performs the requested operation.

Completion coalescing list 18 is a list of connections, or more precisely, connection contexts. A connection context is a data structure (i.e., including data, pointers, fields, bits, flags, etc.) that stores data pertaining to a particular connection. Completion coalescing list 18 is a unidirectional linked list implemented by chaining connection contexts using pointers inside the context. Completion coalescing list 18 holds connection contexts corresponding to connections that have a pending completion request to handle. Reception of a TCP ACK, for example, is one of the triggers that may lead to adding a connection context to completion coalescing list 18 (i.e., a TCP ACK is a trigger for scheduling a connection context in completion coalescing list 18 for completion handling by completion handler 16). Each connection may appear in completion coalescing list 18 only once. If a connection context corresponding to a connection is already chained to completion coalescing list 18, the connection context is updated to carry the most recent information, and is kept in the same location in completion coalescing list 18 where it was originally chained.

Figure 2:
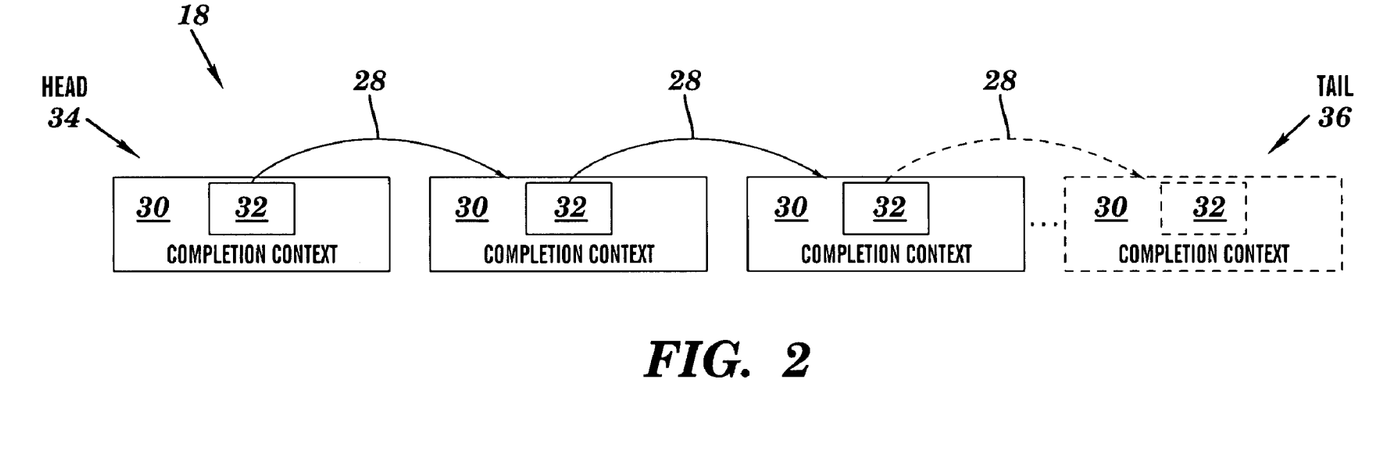
FIG. 2 illustrates the structure of a completion coalescing list in accordance with the present invention.

As illustrated in FIG. 2, completion coalescing list 18 is implemented using a pointer 28 held in each connection context 30. To this extent, each connection context 30 has a field 32 which points, via a pointer 28, to the next connection context 30 in completion coalescing list 18. A connection is added to the tail 36 of completion coalescing list 18 by a request (i.e., a completion request) from Rx TCP logic 20 of TCP logic 12, and removed from the head 34 of completion coalescing list 18 by completion handler 16.

Referring again to FIG. 1, it should be noted that in order to perform a retransmit operation, transmit/retransmit handler 14 needs to make sure that all preceding completion requests for that connection have been completed. The reason for this is that the retransmit operation generally starts from the last not-completed byte of the TCP data stream (or from or inside the last not-completed request of a consumer). Therefore, the completion operation must precede the handling of a retransmit. Since completion requests 24 are normally not handled immediately, and are instead handled by completion handler 16 via completion coalescing list 18, there is a need to make sure that the given connection does not wait in completion coalescing list 18 prior to completion handling by completion handler 16. To ensure that the completion operation is completed as soon as possible for that connection, transmit/retransmit handler 14 sends a high-priority completion request $24_{HP}$ to completion handler 16, requesting that completion handler 16 perform the completion operation as soon as possible for the given connection (i.e., completion coalescing list 18 is bypassed). Transmit/retransmit handler 14 subsequently waits for completion of this operation, and only then performs the retransmit operation.

Completion handler 16 is configured to take (i.e., pull) connection contexts 30 one-by-one from the head 34 (FIG. 2) of completion coalescing list 18, and uses completion information in each pulled connection context 30 to perform a completion operation in a manner known in the art. As described above, completion hander 16 may also receive a high-priority completion request $24_{HP}$ from transmit/retransmit handler 14 logic to perform an "urgent" completion operation for the specified connection. In such a case, completion handler 16 finishes the current completion operation, and performs the completion operation requested by transmit/retransmit handler 14.

As detailed above, connection contexts 30 are chained in completion coalescing list 18 using a pointer 28 held in field 32 of each connection context 30. To be more precise, connection contexts 30 are chained in completion coalescing list 18 using a Context[Ch#]::NextInAckList field 32 in connection context 30.

Figure 3A:
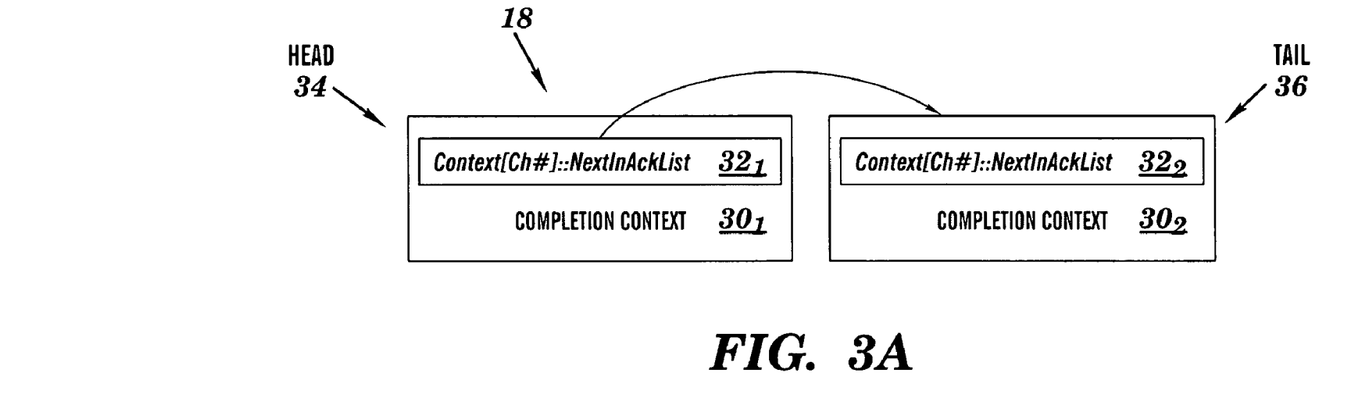
FIGS. 3A-3B illustrate the addition of a completion context to the completion coalescing list in accordance with the present invention.

The Context[Ch#]::NextInAckList field 32 of connection context 30 holds the connection number of the next connection context 30 in the chain of connection contexts 30 forming completion coalescing list 18 (i.e., the Context[Ch#]::NextInAckList field 32 effectively provides a pointer 28 to the next connection context 30 in the chain). When adding a new connection context 30 to the chain (e.g., upon receipt of a new TCP ACK), the Context[Ch#]::NextInAckList field 32 of the last connection context 30 of the chain is updated to refer to the newly added connection context 30. This is shown in a simplistic manner in FIGS. 3A and 3B. Specifically, in FIG. 3A, completion coalescing list 18 is shown as including two connection contexts 301, 302 chained together, with the Context[Ch#]::NextInAckList field 32, of connection context 30, pointing (pointer 281) to the last connection context (i.e., connection context 302) in completion coalescing list 18. When a new connection context 303 is added to the tail 36 of the chain (e.g., upon receipt of a new TCP ACK), the Context[Ch#]::NextInAckList field 322 of connection context 302 is updated to refer (pointer 282) to the newly added connection context 303, which now is located at the tail 36 of completion coalescing list 18.

Figure 3B:
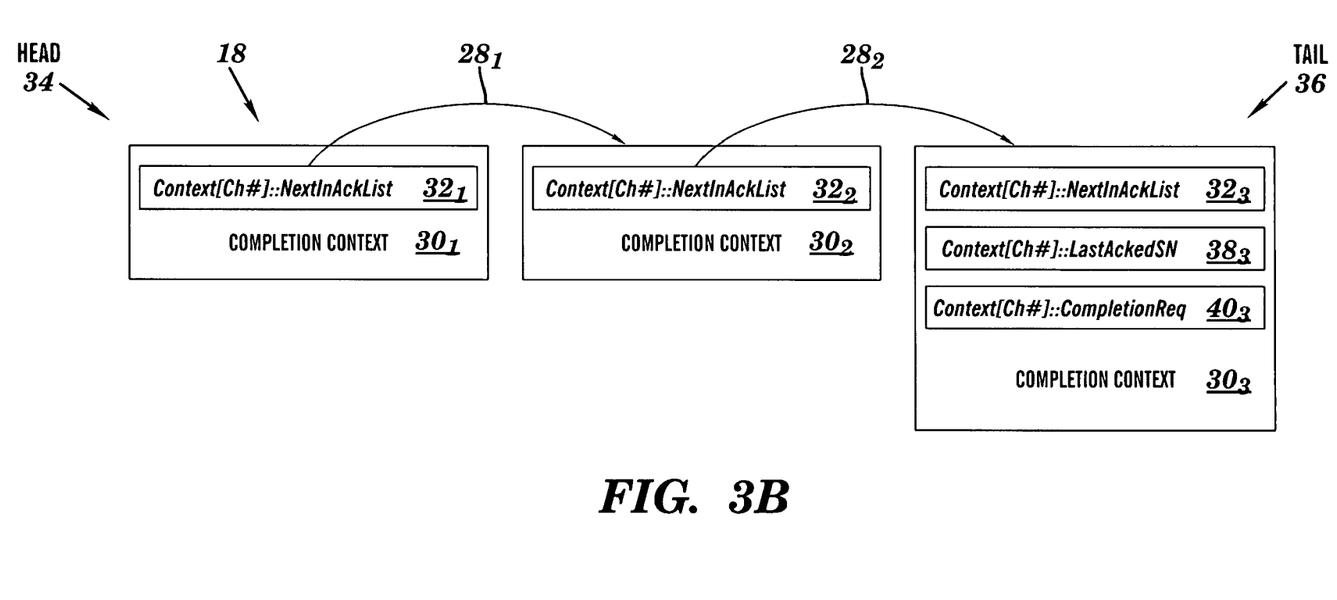

When a new TCP ACK arrives, Rx TCP logic 20 of TCP logic 12 first updates the TCP ACK information carried by the received TCP segment, using the Context[Ch#]::LastAckedSN field 38 of connection context 30 (see, e.g., the Context[Ch#]::LastAckedSN field 383 in connection context 303, FIG. 3B). Although not shown in FIG. 3B, each connection context 30 includes a Context[Ch#]::LastAckedSN field 38. Connection context 30 field Context[Ch#]::LastAckedSN 38 indicates the sequence number of the last acknowledged byte of the TCP data stream.

Connection context 30 also holds a bit indicating whether or not the connection context has a valid completion processing request. This bit is provided in the Context[Ch#]::CompletionReq field 40 of connection context 30 (see, e.g., the Context[Ch#]::CompletionReq field 403 in connection context 303, FIG. 3B). Although not shown in FIG. 3B, each connection context 30 includes a Context[Ch#]::CompletionReq field 40. This bit also indicates whether connection context 30 has already been chained to completion coalescing list 18 or not. If connection context 30 is already chained to completion coalescing list 18 (i.e., Context[Ch#]::CompletionReq is set), the update of Context[Ch#]::LastAckedSN effectively means the coalescing of ACK information in the connection contexts 30 corresponding to received TCP ACKS.

If a connection context 30 (e.g., a connection context corresponding to a new TCP ACK) does not have any pending completion requests, i.e., Context[Ch#]::CompletionReq is clear, the connection context 30 is added to the tail 36 of completion coalescing list 18, and the Context[Ch#]::NextInAckList field of the last connection context 30 in completion coalescing list 18 is updated to refer to the newly added connection context 30 (i.e., via the connection number of the next connection context 30 in the chain).

Completion requests in completion coalescing list 18 are served by completion handler 16. Completion handler 16 operates a synchronously (i.e., independently, or in parallel with) from transmit/retransmit handler 14 and the Rx TCP logic 20. This allows the completion processing to be kept separate from the posted to transmit requests and inbound TCP traffic.

Completion handler 16 dequeues connection context 30 from the head 34 of completion coalescing list 18, and uses the Context[Ch#]::LastAckedSN field to perform completion processing in a manner known in the art. After processing the completion request, completion handler 16 clears the Context[Ch#]::CompletionReq bit for the corresponding connection context 30. Since the connection context 30 may have been updated with a new completion request during completion processing, completion handler 16 determines whether the Context[Ch#]::LastAckedSN field is equal to the processed LastAckedSN, before clearing the Context[Ch#]::CompletionReq bit. If the Context[Ch#]::LastAckedSN field is not equal to the processed LastAckedSN, the completion handler 16 performs completion processing using the updated LastAckedSN. This is one way to resolve the updating of the LastAckedSN during completion handling. Another way would place that connection back to the end of completion coalescing list 18, and wait for a later service cycle to handle its completion.

The use of a completion coalescing list 18 and completion handler 16 by completion coalescing system 10 reduces completion overhead when compared to prior art completion processing techniques. Although the processing of each completion request involves one or more descriptor read operations, which have a processing cost that is highly dependent on the system configuration (e.g., location of the descriptors, latency of descriptor read operation, etc.), the use of completion coalescing system 10 of the present invention nevertheless reduces the required number of completion request processing operations and allows better utilization of the fetched descriptors. Therefore, in spite of additional reads on the part of connection context needed to perform the completion operation, completion coalescing system 10 of the present invention improves overall system performance. A greater benefit provided by the completion coalescing approach of the present invention is the separation of the completion operation from the TCP receive operation. This allows the completion coalescing system 10 of the present invention to continue to receive new TCP segments, regardless of how slow the completion handling process is.

Another improvement provided by completion coalescing system 10 of the present invention is the decoupling of the processing of inbound TCP segments from completion handler 16. This also reduces performance demands from completion handler 16 and reduces the priority of completion handling. Completion handling becomes a self-tuning mechanism: more connections waiting for completion processing, more aggressive completion coalescing, less time and bandwidth consumed by completion processing.

The completion coalescing list presented above may be adapted to process completion of a pending RDMA Read Request upon the delivery of an inbound RDMA read response. It is assumed for the purpose of this description that the reader has an understanding of the RDMA protocol and its implementation in an RNIC environment commensurate with one skilled in the art. The RDMA protocol is well documented and is available, for example, on the Web at <www.rdmaconsortium.org>.

Figure 4:
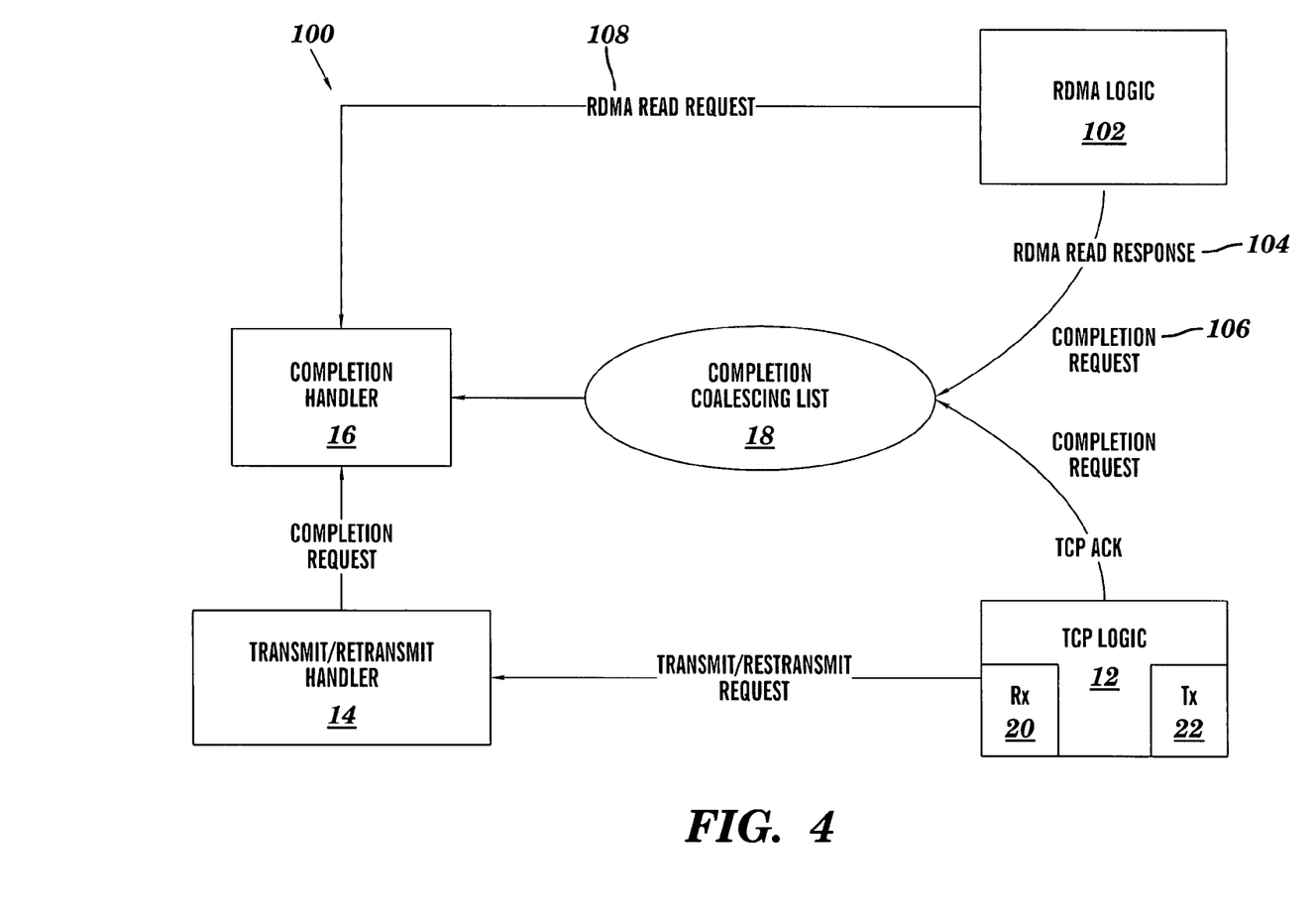
FIG. 4 illustrates a block diagram of a completion coalescing system for the completion processing of TCP ACKS and remote data memory access (RDMA) Read Responses in accordance with the present invention.

A completion coalescing system 100 in accordance with another embodiment of the present invention, and capable of processing completion of a pending RDMA Read Request, is illustrated in FIG. 4. As shown, completion coalescing system 100 comprises TCP logic 12 (including Rx TCP logic 20 and Tx TCP logic 22), transmit/retransmit handler 14, completion handler 16, and completion coalescing list 18, which operate as described above with regard to the corresponding components of completion coalescing system 10. In addition, completion coalescing system 100 includes RDMA logic 102 for handling received RDMA messages.

Figure 5:
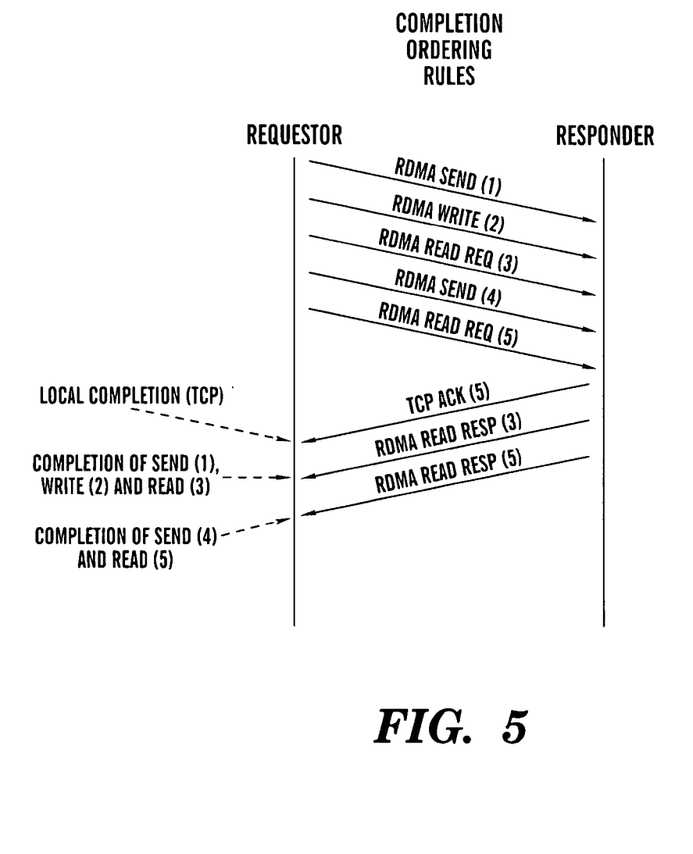
FIG. 5 illustrates the completion ordering rules of the RDMA protocol.

RDMA protocol defines special completion ordering rules (see, e.g., FIG. 5) including, for example, that all RDMA requests must be completed in the order that they have been posted by a consumer. RDMA has three types of requests:

1) RDMA operations consisting of a single RDMA message (e.g., Send, Write). These operations are used to transfer data from a local to remote host, and include a single RDMA message sent from the remote to the local host.

Figure 6:
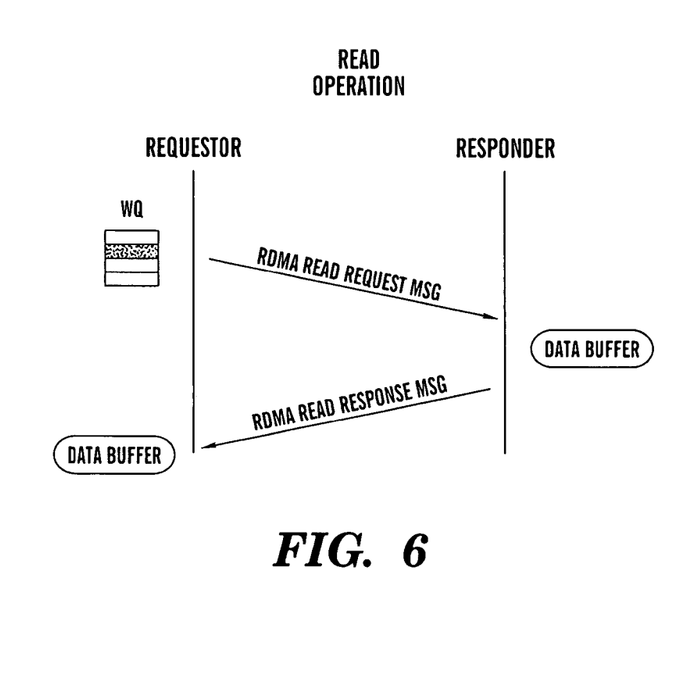
FIG. 6 schematically illustrates an RDMA Read operation.

2) RDMA operations consisting of several (e.g., two) RDMA messages (e.g., Read). The Read operation is intended to read data from a remote memory. Such an operation consists of two RDMA messages: Read Request and Read Response. The Read Request is a message sent by a request originator to the remote data source. The Read Request message carries all information necessary to read the data from the remote memory, and to build a response message. The response message, generated by the remote host, is a Read Response. The Read Response message carries the data to be written to the requester memory, and a description of location to which the data should be written. The Read Operation is illustrated schematically in FIG. 6.

3) Local RDMA operations (like Bind, Fast-Register, etc.), which do not result in the transmission of any data (e.g., a TCP segment).

Local RDMA operations are considered as completed when their processing is finished by the RDMA network interface card (RNIC). Send and Write operations are considered completed when the RNIC can guarantee that all TCP segments in the RDMA message can be reliably transmitted to the other end point of the TCP connection. The Read operation is considered completed when the RDMA Read Response message has been successfully received by Read initiator.

A portion of the completion ordering rules requires that an RDMA Read Request is completed only when an RDMA Read Response message is received. Therefore, in order to support RDMA protocol, the completion handler 16 needs an additional completion indication: reception of an RDMA Read Response 104 (which effectively means completion of a corresponding RDMA Read Request). Thus, when RDMA logic 102 receives an RDMA Read Response 104 it posts a completion request 106 to the completion coalescing list 18. Accordingly, completion handler 16 performs completion operations using both information from TCP ACKS, and received RDMA Read Responses, provided in the connection contexts 30 of completion coalescing list 18.

An approach similar to that described above with regard to the completion processing of received TCP ACKS can be used for the completion processing of pending RDMA Read Requests upon delivery of inbound RDMA Read Responses. To this extent, connection contexts 30 corresponding to RDMA Read Requests are chained in completion coalescing list 18. To allow coalescing of completed RDMA Read Requests, the connection context 30 carries the number of completed RDMA Read Requests in a Context[Ch#]: CompletedReadRequestNum field.

When receive logic of RDMA logic 102 delivers an inbound RDMA Read Response 104, it increases the number of completed RDMA Read Requests, and updates the Context[Ch#]::CompletedReadRequestNum field in connection context 30 accordingly. If a connection is not yet chained to the completion coalescing list 18, i.e., (Context[Ch#]::CompletedReadRequestNum was equal to zero, and Context[Ch#]::CompletionReq is clear), the context is chained to the completion coalescing list 18 by updating the Context[Ch#]::NextInAckList field 32 of the last connection context 30 in the completion coalescing list to point to the newly added connection context 30 (see, e.g., the process illustrated in FIGS. 3A-3B). In addition, upon the chaining of newly added connection context 30 to the completion coalescing list, the Context[Ch#]::CompletionReq bit should be set as well.

Several operations require prior handling of completion requests. For example, operations such as a retransmit request (discussed above) and an inbound RDMA Read Request, may require prior handling of completion requests. An RDMA Read Request, for example, requires prior completion processing only if the Read Queue has no free place to put the request. In this case, RDMA logic 102 needs first to free some space in the Read Queue before processing the RDMA Read Request (this process is described in greater detail below). In both cases, processing of completion requests cannot be delayed and must be performed before processing of the request. In those cases a coalescing bypass is performed, and completion handler 16 receives a separate request 108 to perform completion for the given connection. In this case processing of completion request is done independently from the position of the completion context 30 in the completion coalescing list 18. After completion processing, the processing of the original request (retransmit, inbound RDMA Read Response) can be resumed.

Another completion request that may come from RDMA Logic 124, is a request to perform a "high priority" completion operation for a given connection. This request is similar to the completion request $24_{HP}$ sent to completion handler 16 by transmit/retransmit logic 14 (see description above). This is a blocking request, which means that RDMA Logic 102 waits for completion handler 16 to perform this request. The reason for this request is reception of a RDMA Read Request, and lack of free space in the Receive Queue. RDMA Protocol limits the number of inbound RDMA Read Requests that can be pending (on the wire) in the given moment. This number defines the depth of the Read Queue. Due to coalescing of completion requests (e.g., received TCP ACKS) in the completion coalescing list 18, it might be case that the Read Queue is not cleaned up yet by the completion handler 16 (i.e. the completion request is still in the completion coalescing list 18), and in that case, RDMA logic 102 needs first to free some space in the Read Queue, and only then processes an inbound RDMA Read Request.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method for completion processing, comprising:
    processing inbound TCP segments;
    performing completion processing of received TCP ACKS independently of the processing of the inbound TCP segments;
    scheduling the completion processing of each received TCP ACK using a completion coalescing list; and passing completion information corresponding to each received TCP ACK to a completion handler via the completion coalescing list;

wherein, in response to a retransmit operation, the completion coalescing list is selectively bypassed and the completion information is sent directly to the completion handler for completion processing.

2. The method of claim 1, wherein the completion information corresponding to each received TCP ACK is passed to the completion handler via a connection context in the completion coalescing list.

3. The method of claim 2, further comprising:
chaining the connection context to the completion coalescing list.

4. The method of claim 3, wherein the completion context is only chained to the completion coalescing list if a connection corresponding to the connection context does not have a pending completion request.

5. The method of claim 4, wherein, if the connection corresponding to the connection context does have a pending completion request, updating information in the connection context.

6. The method of claim 5, wherein the updated information in the connection context comprises a last acknowledged sequence number (LastAckedSN).

7. A method for completion processing, comprising:
processing inbound TCP segments;
performing completion processing of received TCP ACKS independently of the processing of the inbound TCP segments, wherein the processing of the inbound TCP segments continues without waiting for the completion processing of each received TCP ACK to finish;
scheduling the completion processing of each received TCP ACK using a completion coalescing list;
processing completion of an RDMA Read Request upon reception of an RDMA Read Response using the completion coalescing list; and
selectively bypassing the completion coalescing list and sending the RDMA Read Request directly to the completion handler for completion processing.

8. The method of claim 7, further comprising:
chaining a connection context corresponding to the RDMA Read Request to the completion coalescing list.

9. The method of claim 7, wherein selectively bypassing the completion coalescing list is performed in response to a Read Queue not having sufficient free space to place the RDMA Read Request.

10. A system for completion processing, comprising:
TCP logic for processing inbound TCP segments;
a system for performing completion processing of received TCP ACKS independently of the processing of the inbound TCP segments;
a completion coalescing list for scheduling completion processing of each received TCP ACK;
a completion handler for completion processing of each received TCP ACK, wherein completion information corresponding to each received TCP ACK is passed to the completion handler via a connection context in a completion coalescing list; and
a transmit/retransmit handler for sending the completion information directly to the completion handler for completion processing in response to a retransmit operation requested by the TCP logic, thereby selectively bypassing the completion coalescing list.

11. The system of claim 10, wherein the TCP logic chains the connection context to the completion coalescing list.

12. The system of claim 11, wherein the TCP logic only chains the completion context to the completion coalescing list if a connection corresponding to the connection context does not have a pending completion request.

13. The system of claim 12, wherein, if the connection corresponding to the connection context does have a pending completion request, the TCP logic updates information in the connection context.

14. The system of claim 13, wherein the updated information in the connection context comprises a last acknowledged sequence number (LastAckedSN).

15. A system for completion processing, comprising:
TCP logic for processing inbound TCP segments;
a system for performing completion processing of received TCP ACKS independently of the processing of the inbound TCP segments, wherein the processing of the inbound TCP segments continues without waiting for the completion processing of each received TCP ACK to finish;
a completion coalescing list for scheduling the completion processing of each received TCP ACK;
RDMA logic for handling received RDMA messages, and for scheduling an RDMA Read Request for completion processing by chaining a connection context corresponding to the RDMA Read Request to the completion coalescing list; and
a completion handler for completion processing of each RDMA Read Request, wherein completion information corresponding to each RDMA Read Request is passed to the completion handler via the connection context in the completion coalescing list;
wherein the RDMA logic is configured to selectively bypass the completion coalescing list and send the RDMA Read Request directly to the completion handler for completion processing.

16. The system of claim 15, wherein the completion coalescing list is selectively bypassed in response to a Read Queue not having sufficient free space to place the RDMA Read Request.

17. A program product stored on a computer readable medium, which when executed, provides completion processing, the computer readable medium comprising program code for:
processing inbound TCP segments;
performing completion processing of received TCP ACKS independently of the processing of the inbound TCP segments;
scheduling the completion processing of each received TCP ACK using a completion coalescing list; and
passing completion information corresponding to each received TCP ACK to a completion handler via the completion coalescing list;
wherein, in response to a retransmit operation, the completion coalescing list is selectively bypassed and the completion information is sent directly to the completion handler for completion processing.

* * * * *